INVENTOR.
Leon F. Thiry
BY
Evans + McCoy
ATTORNEYS

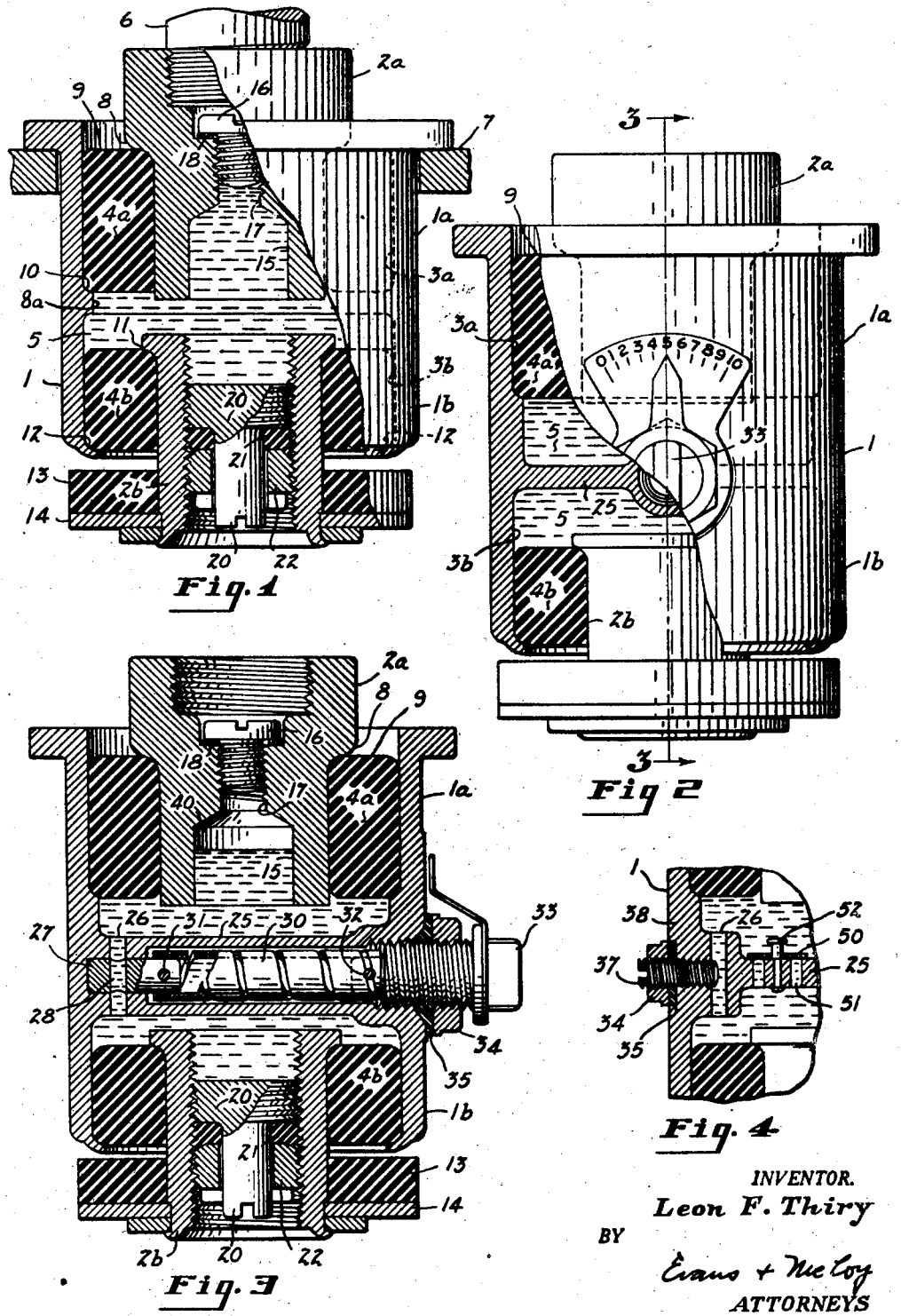

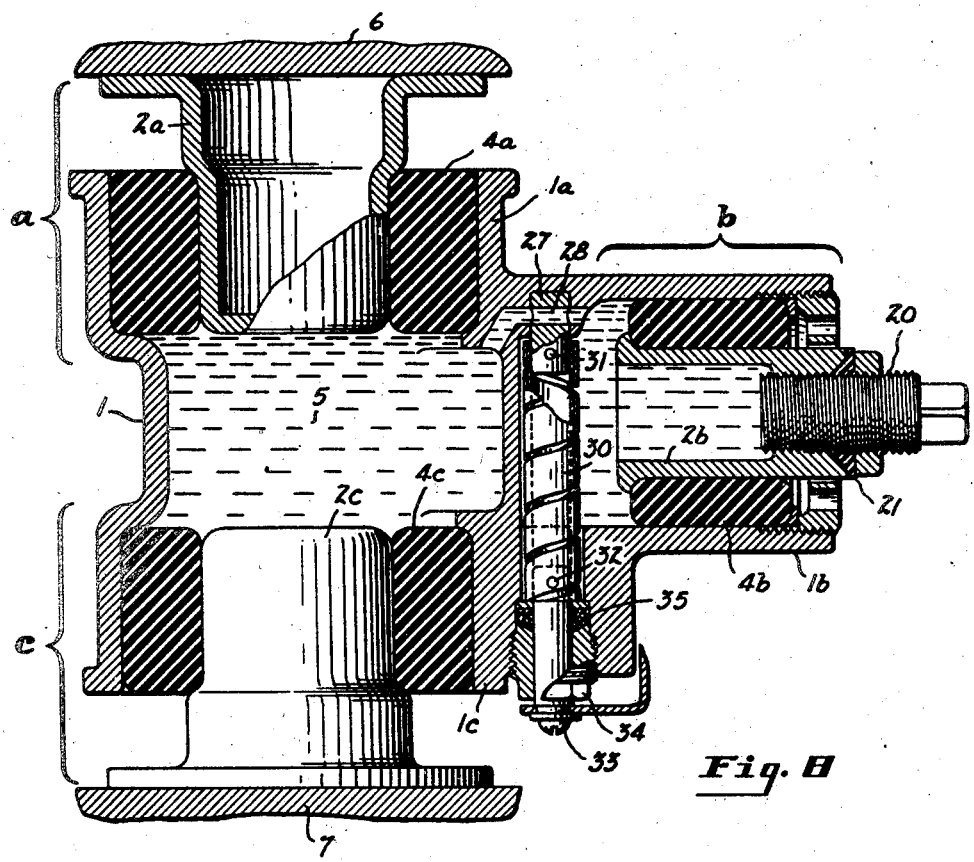

Patented June 3, 1947

2,421,585

UNITED STATES PATENT OFFICE 2,421,585

FLUID-MODIFIED MOUNTING

Leon F. Thiry, Montclair, N. J., assignor to The General Tire & Rubber Company, Akron, Ohio, a corporation of Ohio Application December 13, 1944, Serial No. 568,041

9 Claims. (Cl. 248—358)

This invention relates to vibration-insulating and absorbing mountings. It particularly relates to vibration-absorbing mountings which may readily be made with independent characteristics for each degree of freedom.

It is well known, that for greatest vibration insulation, the softest suspension or the use of mountings having the greatest deflection for unit increase in load should be used. In commercial applications the maximum desirable deflection is usually relatively limited and to sustain the weight of the mounted members it is the general practice to utilize mountings having a higher spring constant than is most desirable for vibration-insulating purposes. A particularly advantageous vibration-absorbing mounting is described in the Thiry Patent 1,782,770. Such mountings, utilizing rubber under a relatively high state of radial compression between rigid coaxial members, have especially desirable characteristics and are also advantageous in that they utilize a relatively small amount of rubber for a given capacity. However, as in other mountings utilizing rubber, if there is sufficient stiffness to sustain high loads in axial direction with but relatively small deflections, the rigidity or stiffness in directions perpendicular is also greatly increased so that the capacity to absorb vibrations in a different direction is materially reduced.

It is therefore an object of the present invention to provide vibration-insulating mountings in which the spring constant in radial directions may be made of any desired value without affecting the spring constant or load-supporting ability in the axial directions of axial members.

It is another object of the invention to provide mountings having a rubber-like material under a state of stress between coaxial members, and having spring constants (deflection per unit of load) which may be made substantially independent for axial and radial directions.

It is another object of the present invention to provide a vibration-absorbing mounting embodying self-contained fluid damping means to absorb vibrational energy and to prevent undue amplitude of vibration under conditions of resonance.

It is a further object of the present invention to provide a vibration-absorbing mounting in which the fluid damping may be adjusted while the mounting is in use.

It is a still further object of the present invention to provide a vibration-absorbing mounting having self-contained fluid damping, which may be automatically maintained at correct adjustment at various temperatures.

Other objects will be apparent in the following description of the invention as illustrated in the accompanying drawings, in which—

Fig. 1 is an elevational view with parts broken away of a mounting embodying the present invention and showing portions of the supporting and supported members attached thereto;

Fig. 2 is an elevational view with portions broken away, of a modified form of mounting embodying the present invention and provided with self-contained fluid damping;

Fig. 3 is a sectional view on line 3—3 of Fig. 2;

Fig. 4 is a longitudinal sectional view through a portion of another modified form of mounting;

Fig. 8 is a longitudinal view, partly in section and with portions broken away, of still another modified form of mounting embodying the present invention, which mounting is adapted to facilitate relative movement between the mounted and mounting members in all directions.

Figure 5:
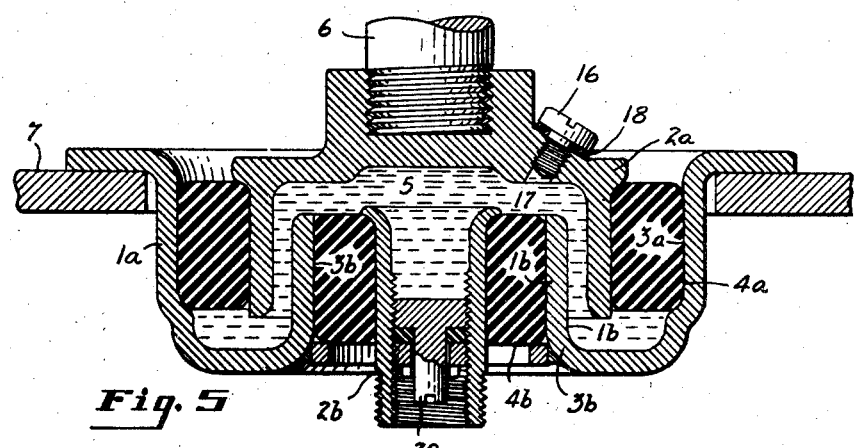
Figs. 5 and 6 are longitudinal sectional views of other modified forms of mounting embodying the present invention.

In accordance with the present invention I accomplish the above objects by fluid coupling of substantially independent mountings so that in response to the main static load they act as mountings arranged in parallel but in response to variable radial loads only one of the mountings may operate independently. The mountings comprise essentially a housing portion which may be connected to one of two relatively moveable members such as a foundation or mounting member and which encloses a fluid-containing cavity, a load-supporting resilient member or diaphragm in contact with said fluid and adapted to cause displacement thereof when the resilient material is deflected, a rigid moveable member carried by the resilient member which is also preferably adapted to contact said fluid and which may be connected to a mounted member such as an engine or other machine, etc., and a fluid passageway, preferably a restricted orifice or tube for fluid cavities of the mounting.

Referring more particularly to the drawings, in which like parts are designated by like numerals of reference throughout the several views, mountings embodying the present invention comprise at least one outer rigid housing member 1 which is annular or preferably of generally tubular shape or has portions 1a and 1b with generally cylindrical inner walls, and a plurality of fluid-coupled inner rigid spaced members or portions 2a, 2b, etc. thereof, each preferably having a substantially cylindrical portion which may be coaxial with respective inner cylindrical surfaces 3a, 3b, etc. of the outer rigid housing member 1. The inner rigid members 2a and 2b are carried by the respective annular resilient members 4a, 4b, etc. in coaxial or substantially concentric relation within the housing member 1.

The fluid-containing cavity or space defined by portions of the housing 1, the spaced annular members 4a and 4b of resilient material, and the inner rigid coaxial members 2a and 2b, is preferably substantially or completely filled with relatively incompressible fluid 5. The fluid 5 being between the members 2a and 2b serves as coupling means to transmit axial deflections from the member 2a to the member 2b so that in response to deflections axially of the member 2a, member 2b is also deflected. For deflections the stress required for given distortion to resilient members 4a and 4b in the completed mounting is equal to the sum of the stresses required for the identical distortion of the two separate members. It is thus seen that the mounting acts in response to deflections in an axial direction as though it were composed of two mountings, disposed in parallel relationship. Since the members 2a and 2b are not rigidly connected and since some air is usually present in the fluid-containing cavity, the deflection of the member 2b therefore lags that of 2a. For small vibrational deflections in an axial direction, the mounting is relatively soft and therefore gives superior vibration insulating characteristics. For heavier vibrations the mounting is relatively stiffer and therefore tends to more effectively limit the extent of the deflection.

As to transverse or radial vibrations between the mounted member 6 and the mounting member or base 7, the spring constant is determined solely by the characteristics of the resilient member 4a and the mounting has substantially the same characteristics in regard to radial movements as though resilient member 4b and the inner rigid member 2b were omitted. It is seen therefore that by varying the sizes of the resilient members 4a and 4b, one can readily obtain desirable characteristics for transverse vibrations without permitting undesirable deflections in longitudinal or axial directions because of the initial load. Thus, by making member 4a in the completed mounting of larger outer diameter or shorter height while simultaneously making the annular resilient member 4b of smaller diameter or greater height, greater radial deflection and greater insulation to transverse vibrations may be obtained without materially changing or decreasing the axial deflection. To further change the load deflection characteristics of the mounting, the inner rigid member 2a may be provided with a cam portion 8 adjacent the free surface 9 of the resilient material 4a so that for great deflections the effective thickness of the resilient material 4a is decreased and stiffening effect obtained. A supporting portion 10 with or without a cam portion 8a extending inwardly from the surface of the housing may also be disposed adjacent the opposite free surface of the annular resilient member 4a to decrease any tendency to relative slippage between the outer housing member 1 and resilient member at extreme loadings or in addition to change the deflection characteristics by means of the cam. Similarly the inner rigid member 2b may be provided with a cam portion 11 and a diagonally disposed cam or supporting portion 12 which together serve as means for decreasing the ease of deflection in the region of high deflections.

A bumper of resilient material 13, preferably annular in shape, may be disposed between rigid bumper supporting means such as a washer 14, rigidly carried by the inner member 2b and the edge portion of the housing 1 to decrease by the fluid coupling action between the portions 2a and 2b the maximum deflections in directions opposite to those controlled by cams 8 and 11. The inner member 2a may be provided with a passageway or chamber 15 which may be formed by suitable boring thereof and which may be provided with a removable plug 16 threaded into the restricted filler portion 17. Gasket sealing means 18 may be provided for effecting a fluid-tight seal between the head of the plug 16 and the member 2a. Removable plug 16 and passageways 15 and 18 serve as closable means for filling the space between the member 4a and 4b with fluid 5.

Since there is sometimes a tendency for loss of fluid 5 and since there is sometimes a permanent set within the resilient material 4a and 4b, it is frequently desirable to provide means such as the plug 20 for varying the pressure on the contained fluid 5 to serve as a simple creep adjustment. A sealing gasket 21 may be provided between the plug 20 and the lock nut 22 to prevent escape of fluid 5.

The resilient materials may be any soft vulcanized compounded rubberlike material including rubber, rubbery polymers or copolymers of suitable polymerizable material, such for example as polymers of dienes having conjugated double bonds, including chloroprene, butadiene, isoprene, and homologues and analogues of these materials, copolymers of one or more such dienes with one or more copolymerizable unsaturated materials, including olefins such as isobutylene and other unsaturated copolymerizable materials including vinyl halides, styrene, halo-styrenes, acrylic and alpha-alkyl substituted acrylic acids, esters and nitriles thereof and vinyl ketones, vinyl pyridine, etc., as well as natural rubbers. Rubbery condensation polymers such as the condensation products of chloro-substituted aliphatic compounds, such for example as ethylene dichloride, with an alkaline polysulfide, and the rubbery condensation products of dibasic acids such as sebacic acid with dihydric alcohols such as ethylene glycol and the like may also be used for certain applications. Rubbery copolymers of a suitable cross-linking agent and polyvinyl chloride, polyvinyl acetate and/or polyvinylidene chloride, etc. may also be used. It is desirable that sufficient cross-linking compounds be present in all cases for vulcanization.

The term "resilient material" as used herein is therefore seen to be used in a generic sense to include any vulcanizable material having physical properties similar to a soft vulcanized or vulcanizable rubber compound.

In the modification of Fig. 2, rigid separating means such as a rigid diaphragm 25 is provided between at least two successive housing portions and between two successive annular resilient members 4a and 4b for separating the space between such members into two fluid-containing chambers. A passageway such as the restricted orifice or tube 26 through the diaphragm 25 is provided between the chambers adjacent opposite sides of the diaphragm 25. Means such as the plug 27 which has an opening 28 therethrough adapted to connect with the passageway and which is journaled within the housing 1, or the diaphragm 25 thereof, is provided for adjusting the size of the connecting orifice or passageway 26 to vary the energy absorption had by fluid damping.

Thermostatic means such as the bimetallic spiral 30, which is connected on the one end by the pin 31 to the orifice regulating means 27 and on the opposite end by the pin 32 to the indicating head 33, may be provided for automatically and thermostatically regulating the size of the passageway 26 to compensate for effects of temperature on the viscosity of the fluid 5. By loosening the lock nut 34 which bears against the resilient gasket 35 the head 33 is made free to turn. Initial adjustment of the orifice-regulating means may be readily had by simply turning the indicating head 33.

When in order to provide fluid damping a restricted passageway is provided between the separated chambers, it is highly desirable to provide a surge chamber which may contain compressible gas to permit flow of fluid 5 therein in response to sudden shock. Thus, a separate chamber may be provided or preferably a portion of the counterbore 15 may contain air or compressible gas 40, which in response to sudden shock is readily compressed to permit flexing of the resilient member 4a prior to the passage of appreciable amounts of fluid through the passageway 26.

In the modification of Fig. 4, the thermostatic orifice-regulating means of Figs. 2 and 3 is substituted by the set screw 37, which is threaded into the wall 38 of the housing 1 and which is adapted to protrude into the orifice or connecting passageway 26 any desired amount. Means such as a check valve having a flapper 50, adapted to cover ports 51 through the rigid diaphragm 25, may be provided for permitting greater ease of flow of fluid from out of one portion of the cavity than from the other. Thus, the flapper, which may be loosely carried on the stem 52 riveted to the diaphragm 25, by closing the ports 51 may cause substantially all of the fluid to pass through the restricted passageway 26 when the inner member is deflected in one direction (downwardly in the drawing) relative to the outer member, whereas when the inner member moves in the opposite direction relative to the outer member, the flapper, by raising from the seat and subsequent opening of the ports 51, permits more rapid return of damping fluid. It is thus seen that the check valve operates as further means for permitting a higher rate of deflection per unit of load in one direction than in the other and it thus serves as means for further preventing resonance of the system.

By varying the size of the orifice either by initial drilling or by adjusting the position of the orifice-regulating means, it will be seen that substantial variations in fluid-damping of a mounting member may be obtained. Since in the mounting shown the damping of the mounting member may be readily regulated under vibrating conditions as well as under static conditions, it is seen that the most apt setting for vibration insulating efficiency may be readily obtained.

By regulating the size and stiffness of the two annular resilient compressible members 4a and 4b, and by also adjusting the fluid damping, it is readily seen that vibrations in all directions may be reduced to a very substantial degree. While I have shown the two fluid-containing compartments arranged adjacent to each other to permit the use of a short passageway or orifice 26, it is obvious that substantially the same result may be obtained when the parallel mountings and compartments therein are spaced at much greater distances so that the passageway 26 is relatively long, say a tube of any length.

Figure 6:
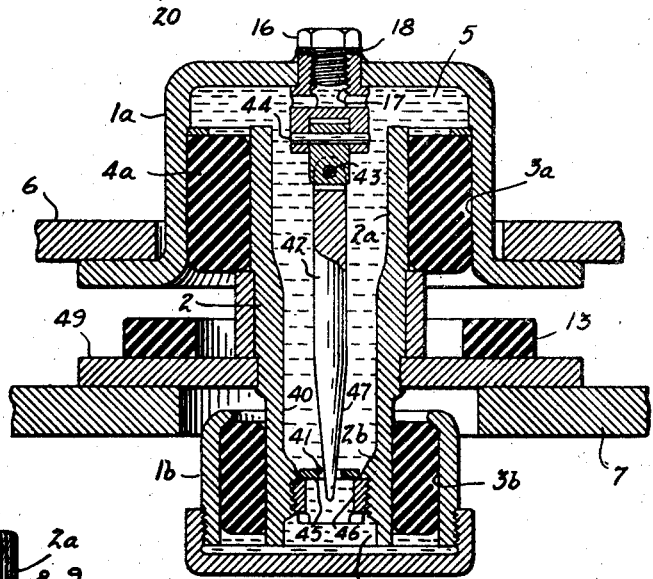
Figure 7:
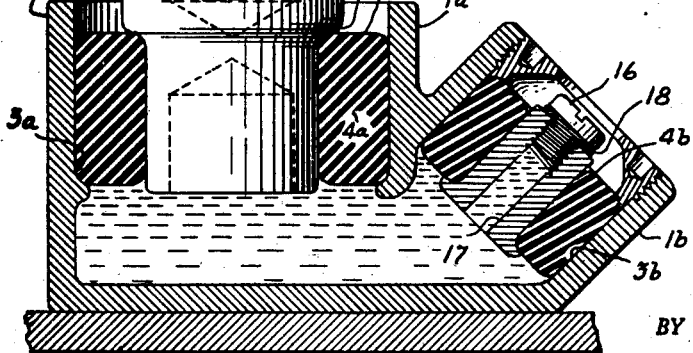
Fig. 7 is a longitudinal view, partly in section, of another modified form of mounting embodying the present invention.

In the modification shown in Figs. 5 to 7 inclusive, the separate units of the mounting are of different diameter. Thus the mounting unit, which comprises a housing portion 1a of the outer member 1, the annular resilient member 4a and the inner member 2a, is of larger diameter than the mounting unit which comprises the housing portion 1b of the outer member 1, the annular resilient member 4b and the inner member 2b.

In the modification of Fig. 5, a cylindrical portion of the inner member 2a is bored out, cored out or otherwise has portions removed to provide a cup-shaped cavity therein of sufficient diameter to receive the portion 1b of the housing or outer member of the cooperating unit, so that the two units are in nested relationship.

In the modification of Fig. 7, while the housing or outer member may, as in the previous figures, be in one piece, the mounting units are disposed with their axes at an angle to each other.

In the modification of Fig. 6, the portions 1a and 1b of the housing or outer member are made in two separate pieces, relatively moveable to each other. The other generally cylindrical portions 2a and 2b of the inner member together form a unitary unit. At least one member of the group consisting of the inner member and the housing or outer member should have sections which are relatively moveable to each other in order to permit the attainment of the maximum benefits of the present invention.

A liquid-containing chamber containing liquid 5 is defined in each of the mounting units by a portion of the outer member or housing, the annular resilient member and a portion of the inner member. A fluid passageway 40, which may be within the inner member, is provided between the fluid-containing chambers in the mounting units. Means, such as a restricted portion or orifice 41 in the passageway 40 which cooperates with the tapered plunger 42, that is, pivotally carried by the pivots 43 and 44 from the outer member 1a of one of the units of the mounting, is preferably provided for modifying the ease of flow of fluid from a portion of the fluid-containing chamber of one mounting unit into the chamber of another mounting unit as the deflection of the resilient members of said mounting units is changed.

The orifice or restricted portion 41 may be disposed within the flap 45 of the check valve if desired. The flap 45 is adapted to make contact with the seat 46 or to raise therefrom, depending upon the direction of fluid flow through the restricted portion 41, and serves as a means for changing the relative ease of rapid deflection in the two axial directions. By providing the plunger 42 with a tapered end portion 47 which extends through the orifice 41, the area for fluid flow through the orifice or restricted portion 41 is decreased upon downward movement of the housing 1a relative to the inner member 2a. In this manner, more uniform fluid damping may be had. Upon reversal of fluid flow due to change in the direction of deflection and change of corresponding fluid flow through the restricted portion 41, the flap 45 may raise from contact with the seat 46 to facilitate more rapid return of fluid.

The filler passageway 17 is through a wall of the outer member and the bumper 13 may be disposed upon a radial flange 49, which is rigidly carried by the inner member 2 and which is adapted to be rigidly connected to one of the relatively moveable elements 7.

In the modification illustrated by Fig. 8 of the drawing, an additional resilient mounting unit, indicated generally by "C," is disposed between the mounting member 7 and the mounted member 6. The housing 1 is therefore resiliently carried relative to both the mounted member 6 and the mounting member 7. The mounting member and the mounted member are thus connected in series through two resilient mounting units, generally designated as A and C, respectively, and there is formed a resilient connection which permits relative oscillatory movement of the mounted and mounting members in lateral as well as vertical directions.

The additional mounting unit comprises a portion 2c of the inner rigid member, which is preferably coaxial with the portion 1c of the housing and carried thereby through the annular resilient member 4c. The member 4c is preferably under radial compression between the inner surface of the housing and the outer cylindrical surface of the portion 2c of the inner member. The member 4c is in fluid-tight relation with both the housing and the portion 2c of the inner rigid member, which portion is in alignment with portion 2a of the unit A and spaced therefrom by relatively incompressible fluid 5. By adjusting the thermostatic means for varying the size of the passageway between the portions of the cavity containing the relatively incompressible fluid as well as by varying the size of the mounting unit B, the characteristics of the mounting may be altered. By adjusting the initial pressure on the inflation fluid, for example by changing the setting of the plug 20, the initial deflection of the mounting may be changed in a desirable manner.

It is also apparent that many modifications of the invention may be made without changing the spirit thereof, and it is intended that the invention be limited only by the appended claims.

What I claim is:

1. A vibration-absorbing mounting for absorbing vibrations between two relatively moveable elements comprising generally tubular housing portions, at least one of which is adapted to be rigidly connected to one of said relatively moveable elements, an annular resilient member within each of said tubular housing portions and carried in fluid-tight relation with the wall thereof, a rigid inner member carried by each of said annular resilient members and being moveable with respect to said housing portions by distortion of said resilient member, said inner members being spaced apart and at least one being adapted to be connected to another of said relatively moveable elements, said housing portions, said inner members and said resilient members defining a cavity adapted to receive and retain fluid under pressure, and a relatively non-compressible fluid within said cavity and adapted to bear against said inner members, whereby upon deflection of one of said inner members relative to said housing, deflection of the other of said inner members occurs through action of said fluid.

2. A vibration-absorbing mounting for absorbing vibration between two relatively movable elements comprising a housing adapted to be rigidly connected to one of said relatively movable elements and having two spaced, generally tubular portions, an annular resilient member within each of said housing portions and carried in fluid-tight relation with the walls thereof, a rigid inner member carried by each of said resilient members and being movable with respect to said housing by distortion of said resilient member, said inner members being spaced apart and at least one being adapted to be connected to another of said relatively movable elements, said housing, said inner members and said resilient members defining a cavity adapted to receive and retain fluid under pressure, incompressible fluid in said cavity, whereby upon axial deflection of one of said inner members relative to said housing, deflection of the other of said inner members occurs through action of said fluid.

3. A vibration-absorbing mounting for absorbing vibration between two relatively moveable elements comprising a housing adapted to be rigidly connected to one of said relatively moveable elements and having two spaced, generally tubular portions, spaced inner members, one of said inner members being substantially coaxial with each of said generally tubular housing portions, an annular resilient member between each of said inner members and the respective housing portion, each of said resilient members being in a state of radial compression between one of said inner members and a housing portion, being in fluid-tight relation with the inner wall of said housing portion and the outer walls of said inner member and carrying said inner member within said housing so that relative movement of said inner member and said housing is accomplished by distortion of said resilient material, said housing, said inner members and said resilient members defining a cavity adapted to receive and retain a compressible and an incompressible fluid within said cavity, whereby upon axial deflection of one of said inner members relative to said housing axial deflection of the other of said inner members occurs through action of said fluids.

4. A vibration-absorbing mounting for absorbing vibration between two relatively moveable elements, comprising a housing adapted to be rigidly connected to one of said relatively moveable elements and having two spaced and generally tubular portions, an annular load-supporting resilient member within each of said housing portions, each of said annular resilient members carrying a portion of an inner rigid member in substantially coaxial relation with at least one of said housing portions, the inner periphery of each of said annular resilient members being in fluid-tight relation with a cooperating portion of an inner member, the outer periphery of said annular resilient member being in fluid-tight relation with one of said housing portions, at least one member of the group consisting of said inner member and said housing having relatively moveable portions, portions of said rigid inner member, portions of said housing and said resilient members together defining a chamber adapted to retain liquid under pressure, and a liquid within said chamber, whereby movement of one of said portions of said inner member relative to one of said portions of said housing causes movement of the other of said portions of said inner member relative to the other portions of said housing.

5. A vibration-absorbing mounting for absorbing vibration between two relatively moveable elements, said mounting having at least two units, each unit comprising a generally tubular portion of an outer member, a portion of an inner member, which portion has a generally cylindrical shape, an annular resilient member between said outer and said inner members and carrying said cylindrical portion of said inner member in substantially coaxial relation within said generally tubular portion of said outer member, said inner member, said outer member and said annular resilient member together defining a chamber, a liquid in said chamber, and a passageway for connecting said chamber to the chamber of another of said cooperating units, said outer member of one of said units being connected to one of said relatively moveable elements, said inner member of the same unit being connected to the other of said relatively moveable elements, at least one of said cooperating units having one of said inner and outer rigid members free to move relative to both of said relatively moveable elements, the parts being arranged so that relative movement of said moveable elements and consequent distortion of said annular resilient member causes fluid flow into the cavity of another unit and relative movement of the rigid inner and outer members thereof.

6. A vibration-absorbing mounting for absorbing vibrations between two relatively moveable elements, said mounting having at least two units, each of two of said units comprising a generally tubular portion of an outer member, a portion of an inner rigid member, which portion has a generally cylindrical shape, an annular resilient member between said portion of said outer member and said portion of said inner member carrying said portion in substantially coaxial relation within said generally tubular portion of said outer member, said outer member, said inner member and said annular resilient member together forming a chamber, liquid in said chamber, and a fluid passageway connecting said chamber to a chamber of another of said cooperating units, cylindrical portions of said inner rigid members of two of said mounting units being rigidly connected together, the outer members of said units being free to move relative to each other by deflection of at least one of said annular resilient members, and means for attaching one of said moveable elements to said inner member and, another of said relatively moveable elements to an outer member of one of said units, whereby relative movement of said moveable elements and consequent distortion of said annular resilient members of one of said units causes distortion of the annular resilient member in the other of said units.

7. A vibration-absorbing mounting for absorbing vibrations between two relatively moveable elements, said mounting having at least two units, each of two of said units comprising a portion of an outer member, which portion has a generally tubular portion, a portion of an inner rigid member, which portion has a generally cylindrical shape, an annular resilient member between said portion of said outer member and said portion of said inner member carrying said portion of said inner member in substantially coaxial relation within said generally tubular portion of said outer member, said outer member, said inner member and said annular resilient member together forming a chamber, liquid in said chamber, a fluid passageway connecting said chamber to a chamber of another of said cooperating units, a restricted portion in said passageway, and means for automatically varying the degree of restriction thereof when the degree of deflection of said resilient member is varied, cylindrical portions of said inner rigid members of two of said mounting units being rigidly connected together, the outer members of said units being free to move relative to each other by deflection of at least one of said annular resilient members, and means for attaching one of said movable elements to said inner member and another of said relatively moveable elements to an outer member of one of said units, whereby relative movement of said moveable elements and consequent distortion of said annular resilient members of one of said units causes distortion of the annular resilient member in the other of said units.

8. A vibration-absorbing mounting for absorbing vibration between two relatively moveable elements, said mounting having at least two units, each unit comprising a rigid outer member having an annular rigid portion, a rigid inner member having a generally cylindrical portion, an annular resilient member between said cylindrical portion of said inner member and the annular portion of said outer member, said inner member, portions of said outer member and said annular resilient member together defining a cavity, liquid in said cavity, said inner member of one of said units having portions removed to provide a cup-shaped bore internally of said cylindrical portions thereof to receive another of said units, and a passageway for fluid between the portions of said cavity in said units.

9. A vibration-absorbing mounting for absorbing vibrations between two relatively movable members, said mounting having two units, each unit comprising a generally tubular portion of an outer member, an inner member having a portion of generally cylindrical shape, an annular resilient member between said outer and said inner member and carrying said cylindrical portion of said inner member in substantially coaxial relation within said tubular portion of said outer member, the axes of said generally tubular portions of said units being at an angle to each other, said inner member, said outer member and said annular resilient member of said units cooperatively defining a chamber and a liquid in said chamber, said outer member being connected to one of said relatively movable elements and said inner member of the one unit being connected to the other of said movable elements, one of said cooperative units having said inner member free to move relative to both of said relatively movable elements, parts being arranged so that relative movement of said movable elements and consequent distortion of said annular resilient member of one unit causes relative movement of the movable elements of another unit.

LEON F. THIRY.